United States Patent [19]

Fretwell

[11] 3,745,251

[45] July 10, 1973

[54] DATA TERMINAL AUTOMATIC CONTROL CIRCUIT

[75] Inventor: Richard D. Fretwell, Columbus, Ohio

[73] Assignee: Design Elements, Inc., Columbus, Ohio

[22] Filed: Jan. 3, 1972

[21] Appl. No.: 214,628

[52] U.S. Cl. ............................ 179/2 DP, 178/66 R
[51] Int. Cl. ............................ H04m 11/06
[58] Field of Search ..................... 179/2 DP, 2 R, 3, 179/4; 340/152, 147 R, 208; 178/66

[56] References Cited

UNITED STATES PATENTS

| | | | |
|---|---|---|---|
| 3,524,935 | 8/1970 | Gonsewski | 179/2 DP |
| 3,466,395 | 9/1969 | Prins | 179/2 DP |
| 3,301,957 | 1/1967 | Germond | 179/2 DP |

*Primary Examiner*—Kathleen H. Claffy
*Assistant Examiner*—Thomas D'Amico
*Attorney*—Anthony D. Cennamo et al.

[57] ABSTRACT

A control circuit providing automatic data terminal answering in response to a ring signal request by a remote machine. The circuit includes: logic circuitry for initiating operation of the terminal and placing the terminal off hook in response to a ring signal; circuitry for monitoring the transmission carrier and the data signal for switching the terminal on hook if the carrier or data transmission ceases for selected periods of time; and circuitry for returning the terminal on hook if a ring signal is not followed by data transmission within a suitable time period. Answer and originate modes are also selectable.

4 Claims, 6 Drawing Figures

Patented July 10, 1973 3,745,251

6 Sheets-Sheet 5

DATA TERMINAL AUTOMATIC CONTROL CIRCUIT

BACKGROUND OF THE INVENTION

Data terminals, such as teletype equipment, are ordinarily interconnected by means of telephone lines. When not in use, the terminal is maintained off line or on hook in a manner analogous to the ordinary telephone reciever being placed on the hook. The terminal is interrogated or asked to respond by a ring signal applied at a ring connection at the terminal junction of the telephone lines.

Conventionally, the ring signal initiates the action of a signalling device such as a bell, buzzer or flashing light. An operator then connects the terminal to the telephone line and thereby places the terminal off hook or on line. This is analogous to lifting a telephone receiver from its hook. The terminal may then be operated to send or receive data.

Such data is ordinarily transmitted by means of frequency shift modulation. The data bits are transmitted in the form of mark and space pulses, the mark being designated by one frequency, the space being designated by another. Data pulses, both to and from a terminal are demodualted and modulated respectively by a modem circuit. An input-output typewriter, computer storage device or other machine is connected to the modem for receiving demodulated incoming data and for sending outgoing data.

There is a need for a control circuit which is capable of controlling the modem and other terminal equipment to permit unattended terminal equipment to automatically respond to interrogation by a ring signal from a remote machine. Such a control cirucit must be capable of enabling the terminal to operate in response to a ring signal without the presence of a human operator. Such a control must also be capable of monitoring the condition of the terminal to assure that it responds by going off hook only if it is capable of receiving data and monitoring the condition of the transmission so that the terminal can be switched on hook if proper data is not sent. Additionally, such a control circuit must be able to be switched to permit it to be manually operated and additionally, to permit it to originate the transmission of data to a remote machine.

SUMMARY OF THE INVENTION

The invention is a circuit for controlling the operation of a communication terminal connected to a transmission system and having a ring signal connection and a data transmitting connection. The terminal includes a modem which is switchably connected to the data transmitting connection, the modem having a data output and a carrier presence indicating output. The circuit has an answer abort timing means having an input connected to the ring connection and having a logic output which shifts from a first to a second state in response to a ring signal and which maintains the second state for a selected first time period after the cessation of the ring signal and then shifts to the first state. A long mark timing means is used having an input connected to the data output and having a logic output which shifts to a first state in response to the presence of transmitted data and which shifts to a second state in response to the absence of data for a selected period of time. A carrier loss timing means is included having an input connected to the modem carrier output and having a logic output which shifts to a first state in response to the presence of a carrier and which shifts to a second state in response to the absence of a carrier for more than a selected period of time. The circuit also has a logic circuit means connected to the outputs of the answer abort timing means, the long mark timing means and the carrier loss timing means, for enabling operation of the terminal including switching the modem into connection with the data transmitting connection for receiving data in response to a ring signal and for maintaining the terminal in an enabled condition at least until the expiration of said first time period and thereafter so long as the long mark timing means and the carrier loss timing means are both in their respective first states.

Figure 1:
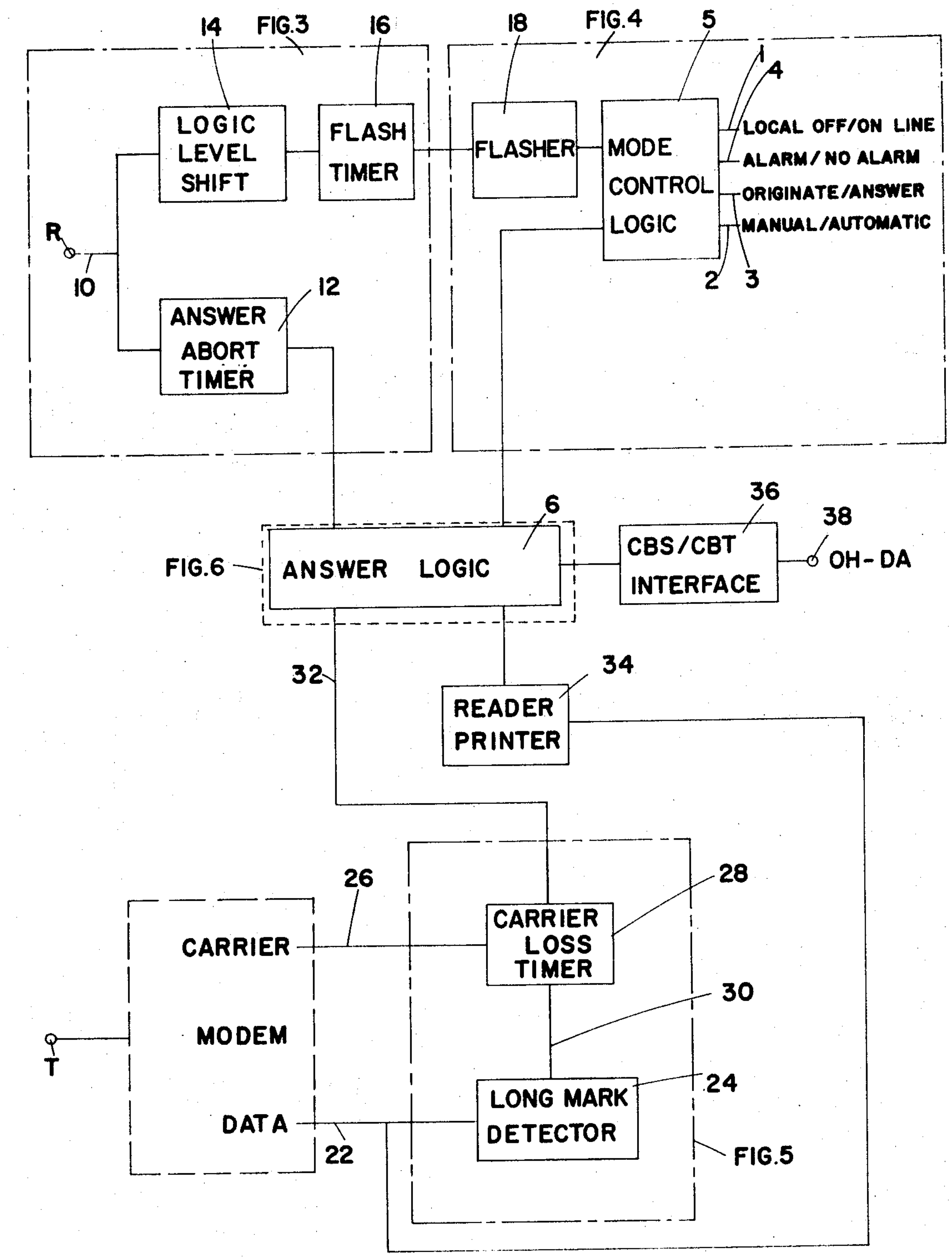
FIG. 1 is a block diagram illustrating the component parts of the preferred embodiment.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the word "connected" includes connection through conductors and also through circuit elements and circuits where such connection would be recognized as equivalent in relationship to the principles of the invention.

DETAILED DESCRIPTION

Referring to FIG. 1, the operative mode of the control circuit of the invention is selected by at least three manual switches accessible at a control panel. A local-off/on-line switch 1 permits the entire terminal to be turned off so that it will not function under any conditions and alternatively permits it be turned on for whatever operation is selected by the other switches. A manual/automatic switch 2 permits the terminal to be operated either manually or in its automatic mode. An originate/answer switch 3 permits the terminal to be used either to originate the transmission of data or to receive data in answer to the call of another machine. Finally, an alarm/no-alarm system has an input 4 which is from the out-put of a monitoring system for monitoring the condition of the terminal, such as, for example, the quantity of paper available in a printer. The alarm/no-alarm switch 4 prevents operation of the terminal, when in its automatic mode, if the terminal is incapable of functioning properly.

These four input signals at the switches 1, 2, 3 and 4 are applied to a mode control logic circuitry 5 which then applies appropriate signals to the answer logic circuitry 6. Mode circuitry 5 also applies a suitable signal to a flasher 18 to prevent operation of the flasher when the terminal is switched on line by the local-off/on-line switch 1.

The control circuit also has an input 10 connected to the terminal R of the telephone company's coupler. The terminal R in a CBT system is normally open-circuit and is connected to ground by a relay contact upon a ring signal. In a CBS system, the terminal R is normally held at a negative voltage and during a ring signal it is shifted to a positive voltage. The occurrence of a ring in either a CBS or CBT system initiates the operation of an answer abort timer 12 and in addition, acting through a logic level shifting circuit 14, initiates the operation of a flash timer 16. Actuation of the flash timer 16 causes the flasher 18 on the control panel to begin flashing to indicate the occurrence of a ring signal.

A modem 20, not a part of the present invention, is used in the data terminal and has an input connected to the data transmitting terminal T of the telephone line. The modem 20 includes a data output 22 which is connected to the input of a long mark detector circuit 24 to apply the demodulated mark and space pulses to the detector circuit 24. The data out-put 22 is also connected to the reader/printer 34 as shown to supply it with data. The modem also contains a carrier detecting circuit which has a carrier presence indicating output 26 connected to a carrier loss timer 28. The long mark detector has an output 30 connected also to the carrier loss timer 28. The output 32 of the carrier loss timer applies its information signal to the answer logic circuit 6.

A CBS/CBT interface 36 receives the two level logic signals from the answer logic circuit 6 and converts it to an output signal which is appropriate for either a CBS or CBT data coupler whichever is connected to the control circuitry. The details of the circuit are not illustrated because it does not form a part of the present invention and described in a copending application. It is sufficient to say that when the terminal is on hook, a −15 volts will be present at OH-DA terminal 38 when the terminal is connected to a CBS data coupler. A floating or unconnected terminal will be presented at the OH-DA terminal 38 for a CBT system. When the circuit is off hook, a +15 volts will be present when a CBS system is connected and the OH-DA terminal 38 will be connected to ground when a CBT data coupler is connected to the terminal.

In response to a ring signal at the terminal R, the answer logic circuit 6 turns on a reader 34, such as an I/O typewriter, or other similar device for receiving data and through a CBS/CBT interface 36 applies an appropriate off hook signal at OH-DA terminal 38. The answer abort timer 12 continues to instruct the answer logic 6 to hold the terminal off hook for 30 seconds. If during that 30 second period a carrier and data from the modem 20 are present, then the answer logic 6 continues to hold the terminal off hook by a suitable signal at the output 32 of the carrier loss timer 28.

If during the initial thirty second interval, no carrier and data are received, the answer abort timer output will return the terminal to its on hook condition when its output shifts after 30 seconds.

If, however, the terminal is off hook and being held off hook by the presence of a carrier and data, the terminal will continue off hook so long as a carrier and data are present. However, if the long mark detector 24 detects the presence of a long mark for a period of 30 seconds, it applies a signal through a carrier loss timer 28 and its output 32 to the answer logic 6 instructing the answer logic 6 to switch the terminal on hook. Such a long mark ordinarily signals the end of a transmission from a remote machine and consequently serves to instruct the local terminal to hang-up.

Additionally, if, during a transmission, there is a loss of carrier which interrupts the transmission for a time period greater than 5 seconds, then the carrier loss timer 28 instructs the answer logic to place the terminal back on hook because the transmission is faulty. However, if the carrier interruption is less than 5 seconds, the carrier loss timer 28 will maintain the terminal off hook because such a loss of data can be tolerated.

Figure 2:
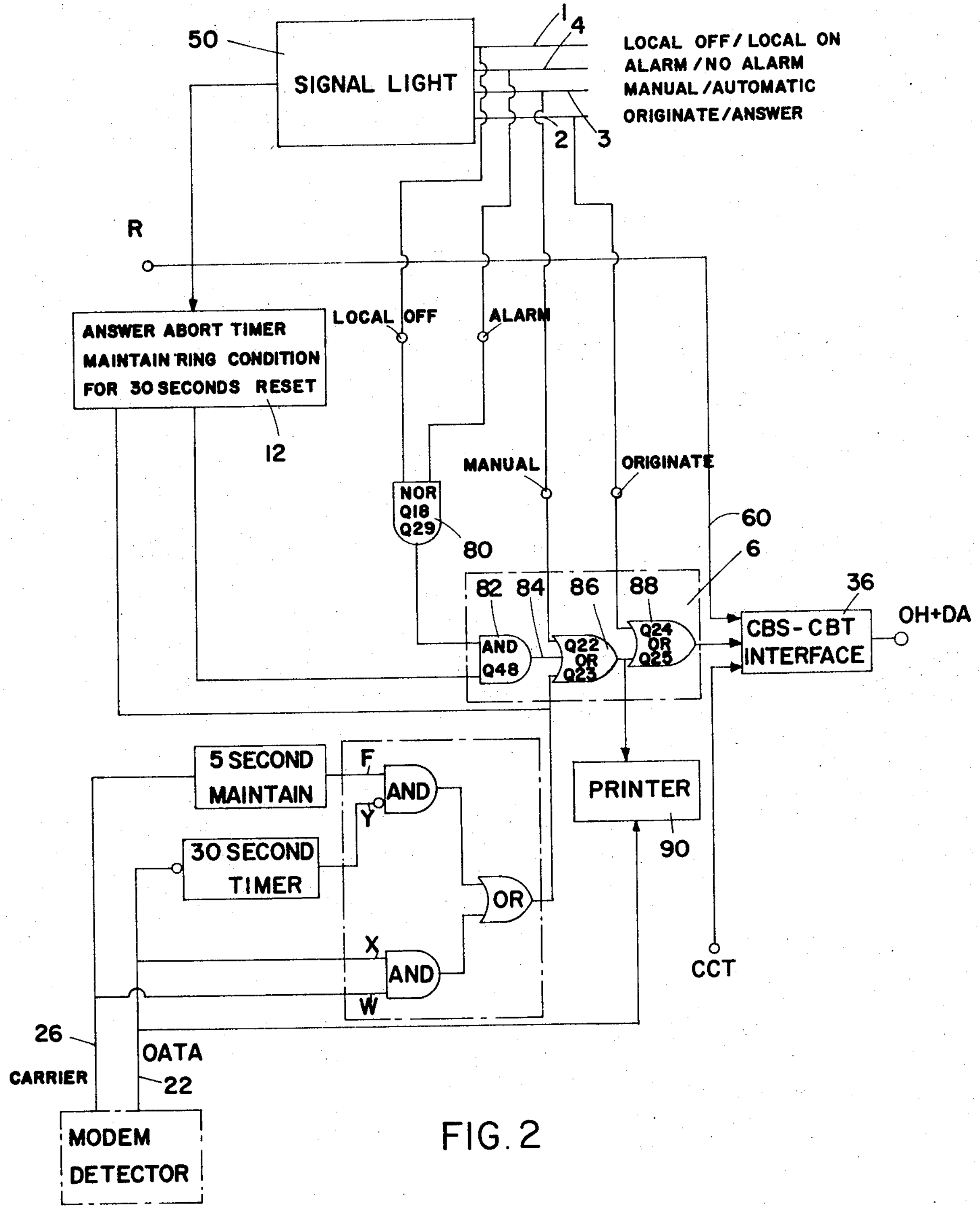
FIG. 2 is a modified logic diagram illustrating the operation of the preferred embodiment.

FIG. 1 also indicates which portions of the schematic diagram of the circuit illustrated in FIGS. 3–6 are illustrated in each Figure. FIG. 2 is a logic diagram illustrating the operation of the circuit illustrated in FIGS. 3–6.

In FIG. 2, the flasher and other condition signal lights circuit 50 are lumped in a single box and respond to the condition of the four mode control inputs 1, 2, 3 and 4. One function of the signal circuitry 50 is to illuminate a panel light when the mode control inputs are switched to local on, automatic, answer and no alarm, that is the panel light is to be on continuously when the terminal is conditioned for automatic response to calls. The panel light is otherwise to be off except that it is to flash when input 1 is switch to off hook and a ring signal is being received. The specific circuitry for accomplishing this function is illustrated in FIGS. 3 and 4.

Figure 3:
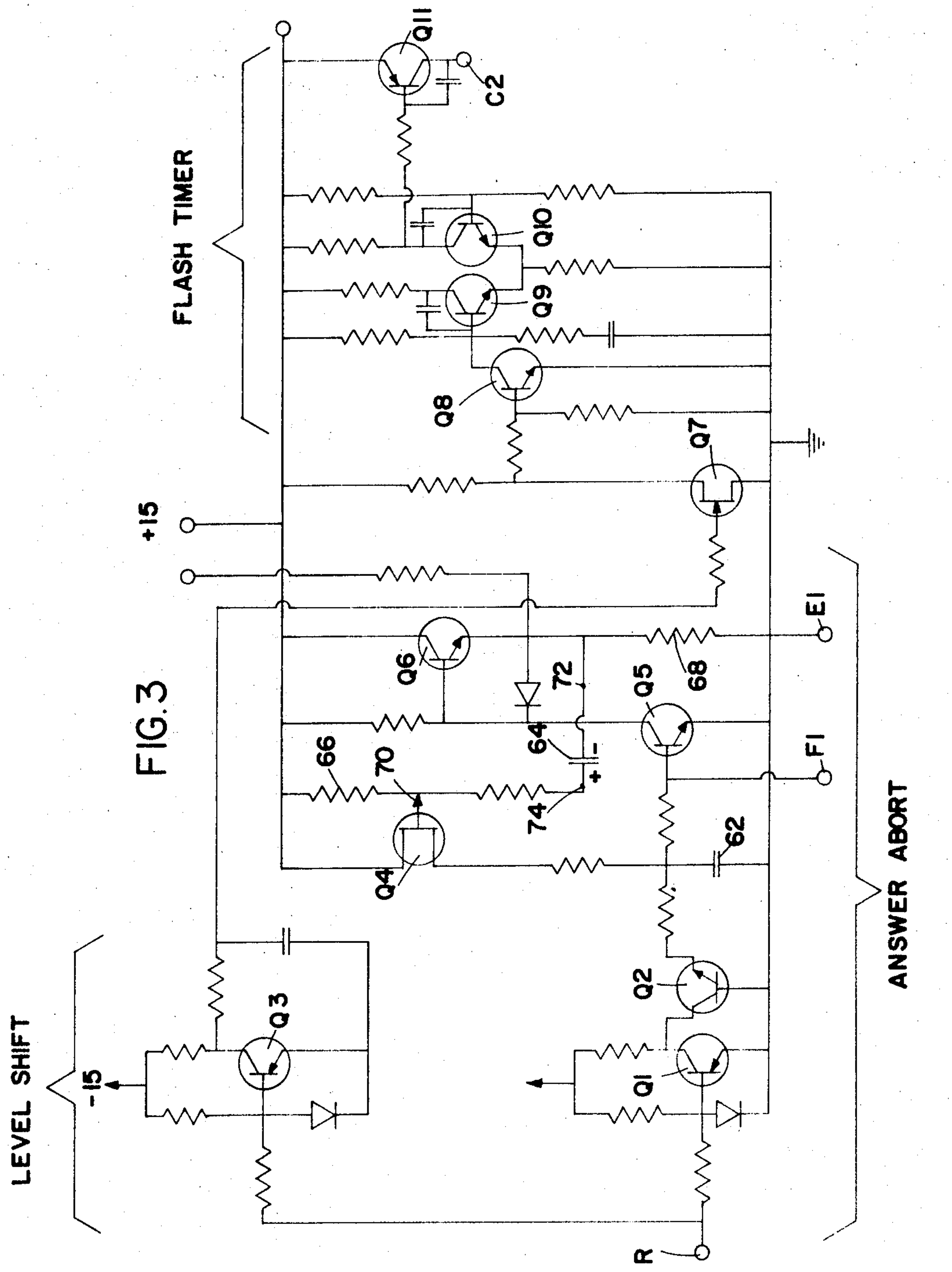
FIG. 3 is a schematic diagram illustrating a component part of the system shown in FIG. 1.

In FIG. 3, a ring signal at terminal R is applied through a level shifting circuit having active element $Q_3$ to a transistor $Q_7$. The transistor $Q_7$ is normally nonconducting but is brought to a conducting state by each ring pulse which occurs at the terminal R.

The transistor $Q_7$ controls a flash timer circuit having a mono-stable multivbrator using transistors $Q_9$ and $Q_{10}$ which are controlled by transistors $Q_8$ and $Q_7$. This multivibrator is stable with $Q_{10}$ conducting and $Q_9$ nonconducting. The occurrence of a single ring pulse will switch transistors $Q_7$ and $Q_8$ to flip the flash timer to its unstable state with $Q_9$ conducting. This will turn on the transistor $Q_{11}$. The multivibrator will remain in its unstable condition holding $Q_{11}$ on for a period of time greater than the time interval between ring pulses. The function of the flash timer is to prevent intermittent operation of the flasher only during ring pulses. Thus, the output voltage at output terminal $C_2$ is normally at ground potential but upon the occurrence of a ring pulse shifts to a substantially +15 volt level. The output terminal $C_2$ remains at the +15 volt level both during and between rings and for a brief period of time thereafter.

Figure 4:
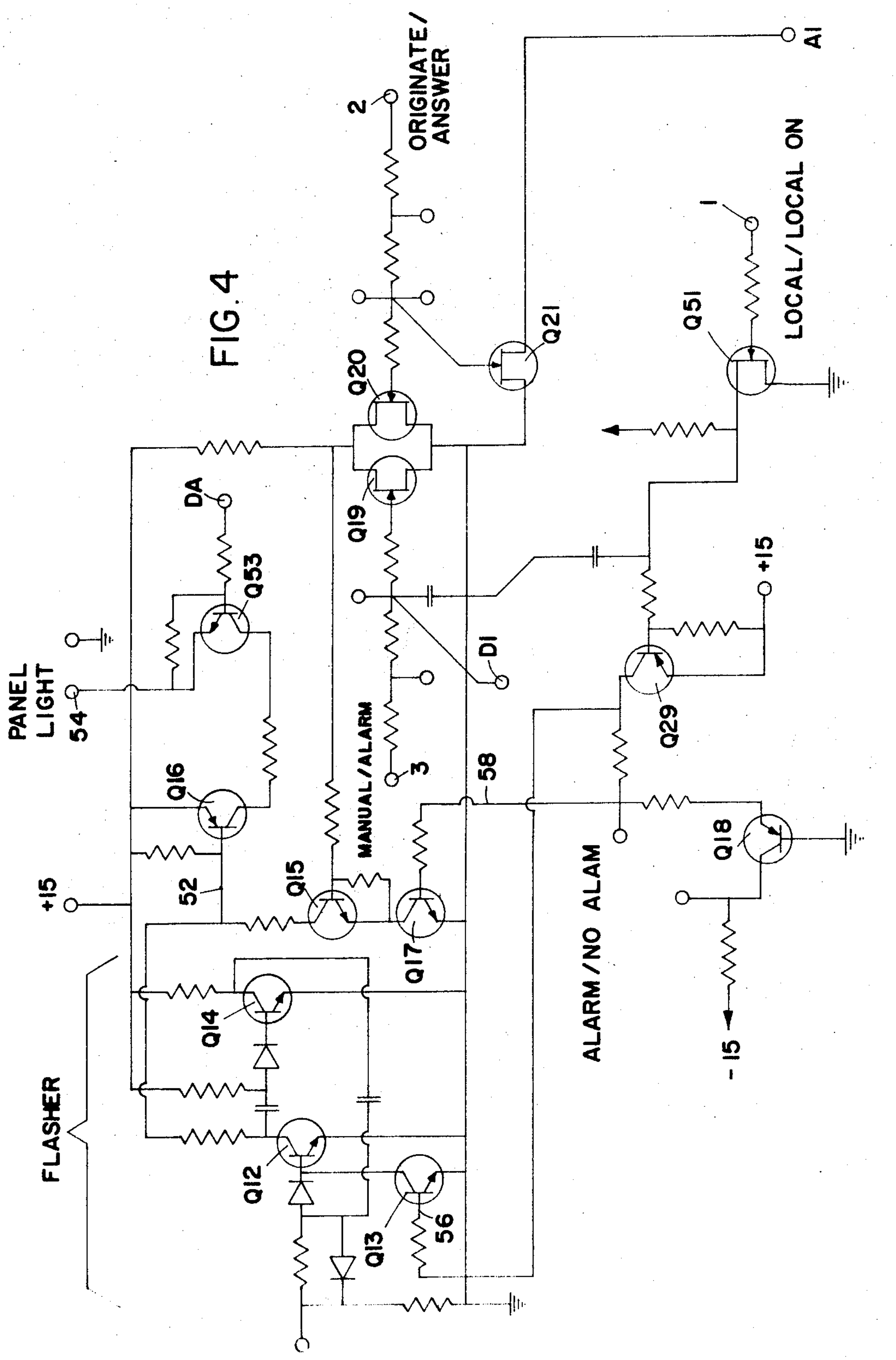
FIG. 4 is a schematic diagram of another component part of the system illustrated in FIG. 1.

The terminal $C_2$ of FIG. 3 is connected directly to the terminal $C_1$ illustrated in FIG. 4. In FIG. 4, the transistors $Q_{12}$ and $Q_{14}$ form an astable multivibrator which switches at the flashing rate when the terminal $C_1$ is at substantially +15 volts.

The alternating flash voltage shift from the output circuit of transistor $Q_{12}$ is applied to the base terminal 52 of the transistor $Q_{16}$. The flash signal is therefore applied to the panel light 54 through transistor $Q_{16}$ and $Q_{53}$, when the transistor $Q_{53}$ is in the proper condition to flash the panel light 54. The transistor $Q_{53}$ is normally conducting and is for preventing flashing of the panel light 54 by being switched nonconducting when the control circuit is not connected to direct access with the telephone lines. A voltage applied at terminal DA, connected to transistor $Q_{53}$, turns transistor $Q_{53}$ to its conducting condition when the terminal is properly connected for direct access. When it is not so connected, the voltage at terminal 53 renders the transistor $Q_{53}$ nonconducting to prevent panel light flashes.

A transistor $Q_{13}$ is connected to the input of the transistor $Q_{12}$ to prevent flashing of the light when the local-off/local-on input 1 is switched to local-on. This is accomplished by connecting its base 56 through level shifting transistor $Q_{29}$ and level shifting transistor $Q_{51}$ to the local-off/local-on terminal 1. The transistor $Q_{13}$ is rendered conducting when the input 1 is switched to local-on and thereby prevents oscillation of the flasher transistors $Q_{12}$ and $Q_{14}$. When, however, the local-off/local-on input 1 is switched to local-off, the transisor 13 becomes nonconducting and has no effect upon the flasher circuit.

Transistors $Q_{15}$ and $Q_{17}$ are serially connected and are connected to the base 52 of the transistor $Q_{16}$ to turn the transistor $Q_{16}$ continuously on whenever the mode control switches 1, 2, 3 and 4 are switched to local-on, no alarm, automatic and answer.

The transistor $Q_{17}$ has its base connected directly to the alarm/no-alarm terminal 4. The input 58 to the transistor $Q_{17}$ will be switched to substantially a +15 volts by the switching to conduction of the transistor $Q_{29}$ when the local-off/local-on switch is switched to local-on and if the alarm/no alarm terminal signals no alarm by having no voltage applied to its input. This will render transistor $Q_{17}$ conducting. The occurrence of an alarm input at the terminal 4 causes the terminal 4 to be connected directly to ground thereby rendering transistor $Q_{17}$ nonconducting.

The manual/automatic input 3 and the originate/answer input 2 are connected through suitable resistors to an "and" circuit formed by transistors $Q_{19}$ and $Q_{20}$. Transistor $Q_{19}$ is switched to a conducting state when the input terminal 3 is switched to manual and it is switched to a non-conducting state when the input terminal 3 is switched to automatic. Similarly, the transistor $Q_{20}$ is switched to a nonconducting state when the input terminal 2 is switched to answer and it is switched to a conducting state when the input terminal 2 is switched to originate. Therefore, with an automatic input at terminal 3 and an answer input at terminal 2, both transistor $Q_{19}$ and $Q_{20}$ will be nonconducting thereby connecting the base of the transistor $Q_{15}$ to a substantially +15 volt and rendering the transistor $Q_{15}$ in a conducting state. With both transistors $Q_{15}$ and $Q_{17}$ conducting from the appropriate inputs, the base of transistor 16 is connected essentially to ground turning on $Q_{16}$ and, through transistor $Q_{53}$ if the DA terminal input is appropriate, turning on the panel light 54 and holding it continuously on.

In any condition, other than the two described above, the panel light will be held continuously off.

Returning now to FIG. 2, the ring input terminal R is, in addition to being connected to the signal light circuit 50 is also connected to the CBS/CBT interface 36 through a conductor 60. This connection however, is utilized by the CBS/CBT interface to sense whether it is connected in a CBS or a CBT data coupler. However, because this circuit 36 forms a part of a separate pending application and because the interface circuit 36 could be replaced by a manually switchable circuit for converting to the proper output, the details of this circuit are not illustrated.

The input terminal R is also connected to an answer abort timer 12. The answer abort timer is illustrated in detail in FIG. 3. A ring signal is applied from terminal R through level shifting transistors $Q_1$ and $Q_2$ and a noise filtering capacitor 62 to the input of transistor $Q_5$. When no ring signal is present, transistor $Q_2$ is nonconducting and transistor $Q_5$ is in a conducting state being held in a conducting state by transistor $Q_4$ which is itself biased to a conducting state. A timing capacitance 64 is connected through suitable resistors 66 and 68 between the gate 70 of the transistor $Q_4$ and the answer abort output terminal $E_1$. As will be seen below, the terminal $E_1$ is essentially connected to ground when the mode is local-on and there is no alarm condition. Thus, with no alarm condition, the transistor $Q_5$ is held in a conducting state when holds the transistor $Q_6$ in a nonconducting state permitting the timing capacitance 64 to charge to substantially +15 volts.

The occurrence of a ring pulse at terminal R causes transistor $Q_1$ to go to a nonconducting state which causes transistor $Q_2$ to go to a conducting state which in turn switches transistor $Q_5$ to a nonconducting state. This switching of transistor $Q_5$ to a nonconducting state causes the transistor $Q_6$ to go to a conducting state thereby raising the previously grounded terminal 72 of the timing capacitor 64 to a +15 volt level. This in turn raises the terminal 74 of the capacitor 64 to an initial +30 volt level because of the +15 volt charge stored on the capacitor. The raising of the terminal 74 of the capacitance 64 to a total of a +30 volt level immediately switches the transistor $Q_4$ off, thereby holding transistor $Q_5$ off.

Therefore, the output terminal $E_1$ of the answer abort timer is switched to a +15 volt by the occurrence of a ring pulse. It will remain at this voltage level until the capacitance 64 discharges sufficiently to permit the transistor $Q_4$ to again become conducting. The circuit is preferably designed for this selected time delay to be 30 seconds. The raising of the output terminal $E_1$ to a +15 volt level signals the answer logic signal of FIG. 1 to go off hook. The answer abort circuit will therefore hold the terminal off hook by this +15 volts at the terminal $E_1$ for 30 seconds. At the end of the 30 second interval the terminal $E_1$ will return to the ground level when the transistor 4 turns on thereby turning on the transistor $Q_5$ and turning the transistor $Q_6$ off. Unless data has begun being sent within that 30 second time interval, this will place the terminal back on hook. This function is provided in case a remote machine fails to send data after calling the local terminal. A reset input terminal $F_1$ is connected as discussed below to reset the answer abort timer if a carrier is present within this 30 second interval.

Returning to FIG. 1 and FIG. 2, the long mark detector 24 and the carrier loss timer 28 are shown diagrammatically in FIG. 2. FIG. 2 shows that when a carrier is present as signalled at the modem output 26 and data is being sent from the modem output 22, then the answer logic 6 is instructed through the connection 32 to maintain the terminal off hook. If the carrier ceases but for less than 5 second interval and if the long mark detector has not detected a long mark, the answer logic 6 will similarly be instructed through the connection 32 to remain off hook.

If, however, the carrier ceases and does so for more than 5 seconds, the instruction on the connection 32 is lost and the answer logic circuit 6 loses its instruction to stay off hook. Also, if a long mark is detected of duration greater than 30 seconds then similarly the answer logic 6 will cease to receive an off hook instruction at the line 32.

Figure 5:
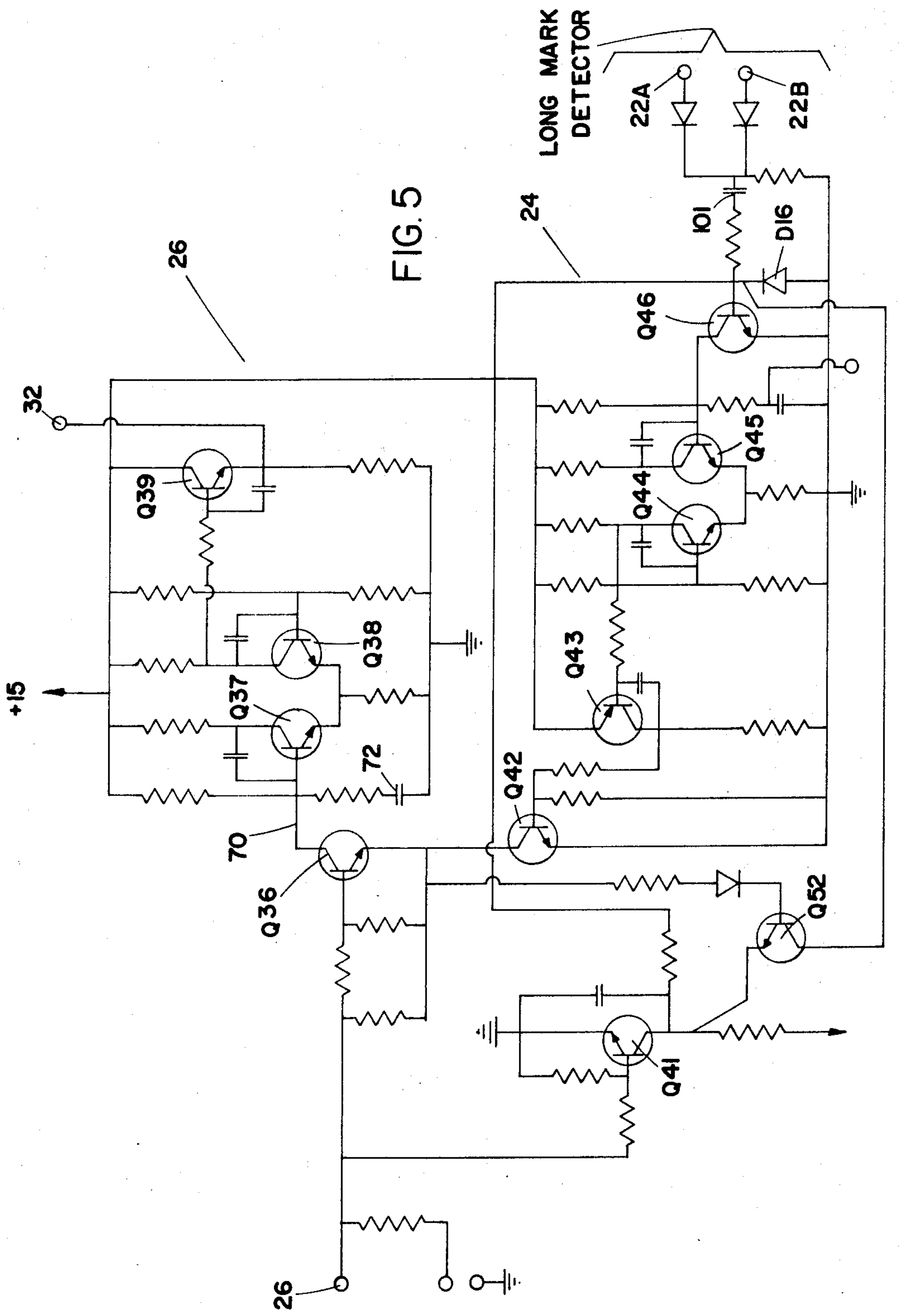
FIG. 5 is a schematic diagram of yet another component part of the system illustrated in FIG. 1.

Referring now to FIG. 5, for the details of these circuits, the data input from the modem is applied at terminal 22A or terminal 22B depending whether the data is being transmitted or received. The data at this point is in the form of voltage level shifts, the carrier having been removed. The data pulses at the terminal 22A or terminal 22B are differentiating circuit using capacitor 101 to provide spikes on the input of the transistor $Q_{46}$. Negative spikes at the input of the transistor $Q_{46}$ are prevented by diode $D_{16}$. Transistors $Q_{44}$ and $Q_{45}$ form a mono-stable multivibrator timing circuit. The circuit is stable with transistor $Q_{44}$ nonconducting and transistor $Q_{45}$ conducting. The occurrence of a spike from the output of the transistor $Q_{46}$ shifts the mono-stable multivibrator to its unstable state to render transistor $Q_{45}$ nonconducting and transistor $Q_{44}$ conducting. Each spike caused by a data pulse will switch transistor $Q_{45}$ fully off. If spikes are absent for a period of 30 seconds, indicating the absence of data, then the multivibrator will return to its stable state with the transistor $Q_{44}$ being switched to a nonconducting state. The transistor $Q_{42}$ is controlled directly by the transistor $Q_{44}$ through the transistor $Q_{43}$. The transistor $Q_{42}$ is held in a conducting state by the occurrence of data and is switched to a nonconducting state when data pulses are absent for a period of 30 seconds. Thus, the condition of the transistor $Q_{44}$ dictates the out-put of the long mark detector 24.

The carrier indicating output 26 of the modem is held at a positive voltage by the modem when a carrier is present and is left open circuit when a carrier is absent. This signal is applied to the input of the transistor $Q_{36}$ to switch the transistor $Q_{36}$ to a conducting state when a carrier is present and to permit the transistor to go nonconducting when no carrier is present. Because the output circuits of the transistors $Q_{36}$ and $Q_{42}$ are in series, the terminal 70 will be connected through them to ground whenever a carrier is present and data has not been absent for 30 seconds. The terminal 70 is connected to another mono-stable multivibrator which is stable with transistor $Q_{38}$ nonconducting and transistor $Q_{37}$ conducting. When the terminal 70 is thereby connected to ground, the transistor $Q_{37}$ is rendered nonconducting and the transistor $Q_{38}$ turns on. This in turn, turns on the transistor $Q_{39}$ which brings the output terminal 32 to a +15 volt level thereby instructing the answer logic circuit 6 to remain off hook.

If the carrier should cease, then the transistor $Q_{36}$ disconnects the terminal 70 from ground. However, a timing capacitance 72 is provided to continue to hold the transistor $Q_{37}$ in its off state for 5 seconds. If the carrier returns within the 5 second interval then it continues to hold the transistor $Q_{37}$ off. If the carrier does not return within 5 seconds, the multivibrator shifts to its stable state with the transistor $Q_{38}$ becoming nonconducting thereby turning transistor $Q_{39}$ off and shifting the output terminal $Q_{32}$ to ground thereby instructing the answer logic circuit 6 to go on hook.

Similarly, of course, the absence of data for 30 seconds disconnects the terminal 70 from ground and permits the monostable multivibrator of transistors $Q_{37}$ and $Q_{38}$ to shift to its stable condition to bring the terminal 32 to ground and thus instruct the answer logic 6 to go on hook.

Transistors $Q_{41}$ and $Q_{52}$ are provided to prevent chatter of the printing mechanism. They prevent any spikes caused by the switching of the terminal from off hook back to on hook from going through the circuitry and being mistaking for data. With a carrier present, the transistor $Q_{41}$ is switched to its conducting condition thereby connecting the emitter of transistor $Q_{52}$ to ground. If a long mark is detected and consequently the transistor $Q_{42}$ becomes nonconducting the base of the transistor $Q_{52}$ will be raised to the plus voltage supplied from the modem at the terminal 26. This will turn transistor $Q_{52}$ on thereby effectively shunting the input to the transistor $Q_{46}$ to ground through the transistors $Q_{41}$ and $Q_{52}$.

Referring now, back to FIG. 2, the answer logic 6 is illustrated diagrammatically. It shows that if neither a local off nor an alarm condition is present in the input of a nor gate 80 and if a ring indicating signal is applied to an "and" gate 82 by the answer abort timer 12 then the output 84 from the "and" gate 82 will, through the "or" gate 86 turn on the printing apparatus 90. Further, through the "or" gate 88 and the CBT/CBS interface 36, the terminal will be taken off hook. The occurrence of carrier and data will cause an instruction at the terminal 32 to be applied to the "or" gate 86 maintaining the circuit in the off hook condition so long as the appropriate voltage level is present at terminal 32. The data terminal may similarly be switched to its off hook condition by switching the manual input 3 to its manual state. Similarly, the originate/answer input 2 can be switched to its originate state to apply an instruction to the "or" gate 88 to switch the terminal off hook. This clearly will have no effect on the printer 90.

Figure 6:
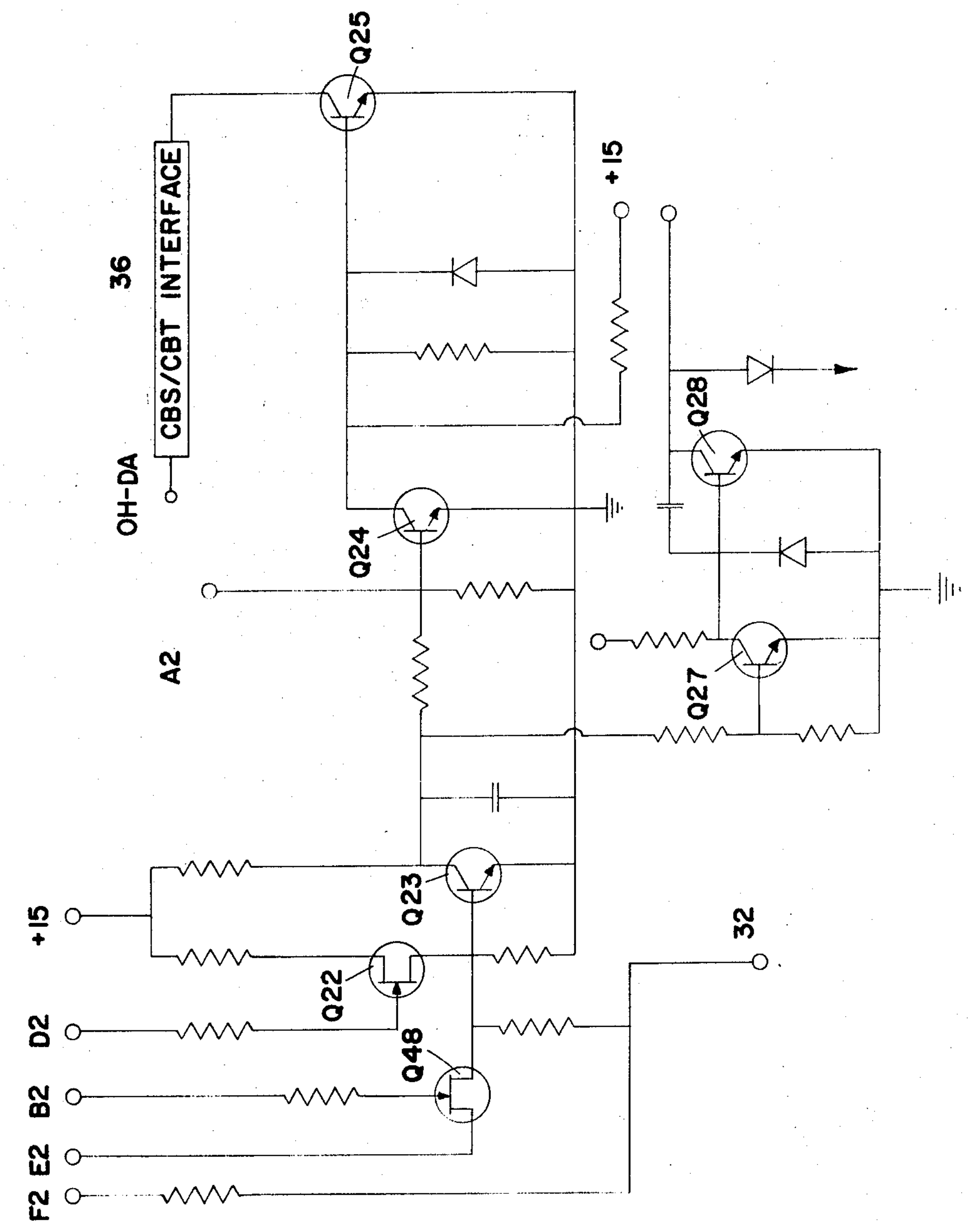
FIG. 6 is a schematic diagram illustrating still another component part of the system illustrated in FIG. 1.

Referring now, to FIG. 6 and FIG. 2, the "and" gate function is provided by the transistor $Q_{48}$. Its terminal $E_2$, as described above is connected to the output terminal $E_1$ of the answer abort timer. Its input terminal $B_2$ is connected to the terminal $B_1$ of FIG. 4. The gate of the transistor $Q_{48}$ switches the transistor $Q_{48}$ to a nonconducting state when the local-off/local-on input 1 is switched to local-off or when an alarm condition exists at the alarm input 4. Thus, when the local data terminal is switched off, or when an alarm condition exists, the transistor $Q_{48}$ is prevented from passing the ring signal from the answer abort timer to the remaining part of the circuitry and thereby prevents the circuit from going off hook.

The "nor" gate 80 of FIG. 2 comprises in FIG. 4, the transistors $Q_{18}$, $Q_{29}$ and $Q_{51}$. With the modem switched to the local-on condition at the terminal 1, the transistor $Q_{29}$ will be conducting thereby connecting the emitter of the transistor $Q_{18}$ to a +15 volts. However, the occurrence of an alarm condition at the terminal 4 will connect the emitter of transistor $Q_{18}$ to ground thereby connecting the terminal $B_1$ to −15 volts. Similarly, the occurrence of a local off input at the terminal 1 will switch the transistor $Q_{29}$ to a nonconducting state thereby similarly, switching the transistor $Q_{18}$ off and switching the gate of transistor $Q_{48}$ to a negative voltage to render the transistor $Q_{48}$ nonconducting.

The transistors $Q_{22}$ and $Q_{23}$ together comprise the "or" gate 86. The transistor $Q_{23}$ is switched to a conducting state by a positive voltage applied through the transistor $Q_{48}$ from the answer abort timer in response to a ring. The transistor $Q_{23}$ is held on by a positive voltage applied at the terminal 32 from the carrier loss timer 28. Finally, the transistor $Q_{23}$ may be turned on by switching the transistor $Q_{22}$ to a conducting condition. The transistor $Q_{22}$ is connected through terminal $D_2$ of FIG. 6 and to terminal $D_1$ of FIG. 4 which is connected to the manual/automatic input terminal 3. When the input terminal 3 is switched to manual the transistor $Q_{22}$ is switched on to switch on the transistor $Q_{23}$.

The "or" gate 88 of FIG. 2 comprises in FIG. 3 the transistors $Q_{24}$ and $Q_{25}$. The switching on of transistor $Q_{23}$ will switch the transistor $Q_{24}$ to an off condition and thereby switch the transistor $Q_{25}$ on. Similarly, the transistor $Q_{24}$ may be switch off and the transistor $Q_{25}$ on by the connection of the terminal $A_2$ of FIG. 6 to the terminal $A_1$ of FIG. 4. The transistor $Q_{24}$ is switched off when the originate/answer input switch terminal 2 is switched to its originate condition. Therefore, whenever the transistor $Q_{25}$ is switched on, a voltage is applied to the OH-DA terminal through the CBS/CBT interface 36 to take the data terminal off hook. When the transistor $Q_{25}$ switches to a nonconducting state, the data terminal is returned to on hook.

It is to be understood that while the detailed drawing describe a preferred embodiment of the invention, they are for the purposes of illustration only, that the apparatus of the invention is not limited to the pricise details and conditions disclosed and that various changes may be made therein without departing from the spirit of the invention which is defined by the following claims.

I claim:

1. A circuit for controlling the operation of a communication terminal connected to a transmission system having a ring signal connection and a data transmitting connection, said terminal including a modem means switchably connected to said data transmitting connection, the modem having a data output and a carrier presence indicating output, said circuit comprising:

a. an answer abort timing means;

b. a long mark timing means;

c. a carrier loss timing means;

d. logic circuit means connected to the outputs of said answer abort timing means, said long mark timing means and said carrier loss timing means for enabling operation of said terminal including switching said modem into connection with said data transmitting connection for receiving data in response to a ring signal and for maintaining said terminal in an enabled condition at least until the expiration of said first time period and thereafter so long as said long mark timing means and said carrier loss timing means are both in their said respective first states; said logic circuit further comprises:

e. an alarm condition monitoring means having an output for switching from a first to a second state whenever said terminal is incapable of functioning properly;

f. a local off switch means for manually presenting automatic operation of said terminal, said local off switching means having an output for switching from a first to second state for preventing operation;

g. "nor" gate means having inputs connected to the outputs of said monitoring means and said local off switch means and having an output for switching from a first state to a second state whenever neither said monitoring means nor said local off switch is in its second state; and h. "and" gate means having inputs connected to the output of said "nor" gate means and the output of said answer abort timing means and having an output for switching from a first state to a second state whenever said "NOR" gate is in its second state, the output of said "and" gate enabling the operation of said terminal when in its second state.

2. A circuit according to claim 1 wherein said logic circuit means further comprises: transmission monitoring logic means having inputs connected to said carrier loss timing means and said long mark timing means and having an output for shifting from a first state to a second state for maintaining the terminal in said enabled condition so long as said carrier loss timing means and said long mark timing means are both in their respective said first states.

3. A circuit according to claim 2 wherein a. a manual/automatic switch is provided for alternatively selecting an automatic and a manual operative mode for said terminal; and b. a first "or" gate means has inputs connected to said manual/automatic switch, to the output of said and gate means, and to the output of said monitoring means, said first "or" gate means having an output for shifting from a first state to a second state and thereby enabling operation of said terminal whenever said monitoring means is in its second state, whenever said "and" gate means is in its second state, and whenever said manual/automatic switch is switched to manual operation.

4. A circuit according to claim 3 wherein a. an originate/answer switch is provided for switching the terminal into its enabled condition without regard to the presence of a ring signal; and b. a second "or" gate means is provided having inputs connected to said originate/answer switch and to the output of said first "or" gate means for enabling operation of said terminal whenever said first "or" gate means is in its second state and whenever said originate/answer switch is switched to its originate condition.

* * * * *